No. 637,819. Patented Nov. 28, 1899.
E. G. P. OELSCHLÄGER.
SYSTEM OF DISTRIBUTING ALTERNATING CURRENTS.
(Application filed Sept. 19, 1898.)
(No Model.)

Witnesses:
Max Zabel.
O. J. Schmidt.

Inventor:
Ernst G. P. Oelschläger,
By Barton & Brown
Attorneys.

UNITED STATES PATENT OFFICE.

ERNST GUSTAV PAUL OELSCHLÄGER, OF WESTEND, GERMANY, ASSIGNOR TO THE SIEMENS & HALSKE ELECTRIC COMPANY OF AMERICA, OF CHICAGO, ILLINOIS.

SYSTEM OF DISTRIBUTING ALTERNATING CURRENTS.

SPECIFICATION forming part of Letters Patent No. 637,819, dated November 28, 1899.

Application filed September 19, 1898. Serial No. 691,352. (No model.)

*To all whom it may concern:*

Be it known that I, ERNST GUSTAV PAUL OELSCHLÄGER, a subject of the Emperor of Germany, residing at Westend, near Berlin, Germany, have invented a certain new and useful Improvement in Systems of Distributing Alternating Currents, (Case No. 159,) of which the following is a full, clear, concise, and exact description.

My invention relates to systems of distributing alternating currents, and has for its object the provision of improved means for indicating the voltage of working circuits at the centers of distribution.

It is essential to know the pressure of current in working conductors at the generating-station, and my invention provides improved means for accomplishing this result. Generally speaking, in accordance with my invention I preferably employ in an improved way a non-inductive resistance which preferably bears a suitable ratio to the resistance of the line up to the translating devices, and I also provide self-induction in circuit with the said resistance, which preferably bears a suitable ratio to the self-induction in the line up to the center of distribution. These respective ratios should be equal to each other.

I will explain my invention more particularly by reference to the accompanying drawings, illustrating the preferred embodiments of the invention, in which—

Figure 1:
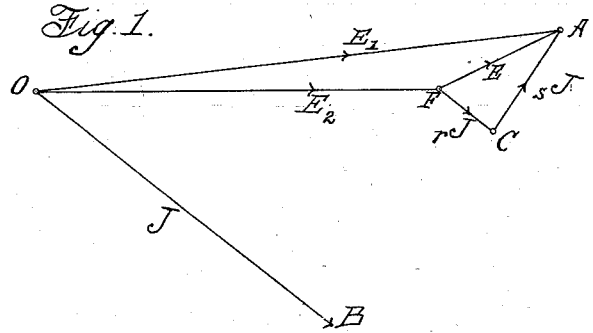
Figure 3:
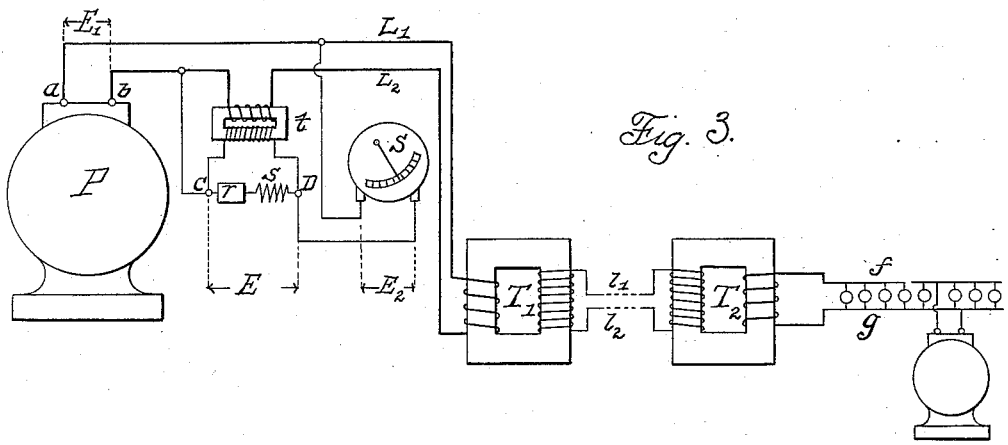
Figure 2:
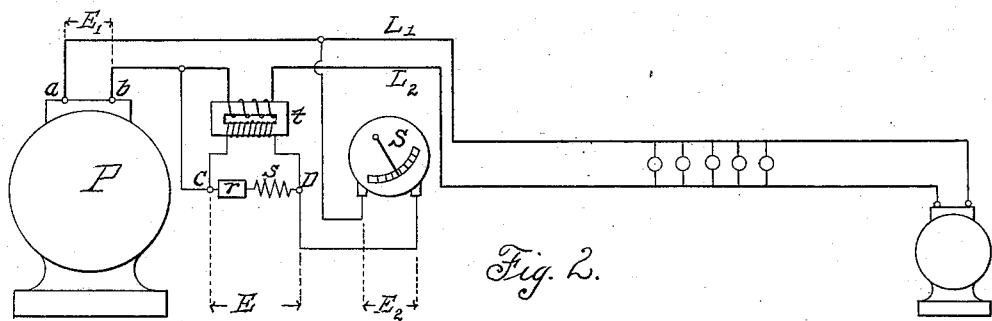

Figure 1 is a phase-diagram illustrating the electrical problems involved. Fig. 2 shows one arrangement of resistance and self-induction windings with a circuit whose potential is to be measured. Fig. 3 shows another arrangement in which transformers are employed in effecting the distribution of the alternating current.

Like letters refer to like parts in the views.

Referring first to Fig. 1, the pressure impressed upon the line E is represented by the line joining the points O and A and is resolved into its two components E and $E^2$. The component $E^2$ represents the pressure delivered at the center of distribution and is represented by the line joining the points O F, and it is this pressure that it is the object of my invention to measure at the generating-station. The component E represents the pressure of the current which is lost in transmission between the generating-station and the center of distribution and is represented by the line joining the points F and A. The main current J lags behind the pressure and is represented by the line joining the points O and B. The drop in potential E has two components $r^J\ s^J$, disposed at right angles to each other, the first component being the drop in potential due to resistance in the line and the second being the drop in potential due to the self-induction in the line. The line drop E, as well as its two components, is proportional to the magnitude of the main current J. The resistance (component $r^J$) must be in phase with the main current if no transformers are interposed between the delivery and supply circuits. A slight displacement in phase is occasioned when transformers are used. The resistance and induction components are proportional, respectively, to the total resistance and induction in the circuit.

In discussing the foregoing diagram the various components and the resultant are spoken of as being the components and the resultant of the potential in the main line. A value proportional to the lost pressure E may be secured by artificial means—such as is shown, for example, in Fig. 2.

I employ a transformer and include the primary thereof in series with the main circuit $L^2$ and include in circuit with the secondary resistance $r$ and inductance $s$, which may be equal to or suitably proportioned with relation to the resistance and self-induction between the generator and the center of distribution. The secondary coil should be chosen according to the instrument that is to be employed, a sufficient number of turns in the secondary being employed to magnify the voltage sufficiently between the terminals of the primary coil. By this arrangement but little power need be wasted in the measuring-circuit, as the number of turns in the primary does not have to be great, the resistance and inductance being also sufficiently large to prevent waste of energy. In order to secure the reading, the voltmeter S in the system shown in Fig. 3 has but one main actuating-coil, one terminal of this coil being connected, as shown, with one line. The other terminal of the coil is connected with a conductor extending to the other line, the conductor including the resistance $r$ and inductance $s$ in series in one branch and the secondary of the transformer in another branch, the said branches being in parallel with each other and together in series with the said conductor, so that the voltage in the secondary circuit is opposed to the voltage between the lines at the generating-station.

As the primary and secondary of the transformer and as the resistance $r$ and the inductance $s$ are all properly proportioned, the drop between the terminals between which are placed the resistance $r$ and inductance $s$ may be made equal to E, and this being the case the voltmeter S may be supplied with but one main actuating-coil of high resistance. The electromotive force E due to the secondary circuit of the transformer and the electromotive force E between the lines at the generating-station oppose each other sufficiently to cause the voltmeter to make the proper indications, the indicator being actuated to correspond to $E^2$.

In Fig. 3 is illustrated a system which is very similar to that shown in Fig. 2, a step-up transformer T' being employed at the generating-station, supplying a step-down transformer $T^2$ at the district of distribution. The primary coil of transformer $t$ is shown included in a main conductor $L^2$ between an alternating generator P and the step-up transformer T'. The lines $L^2$ and L' are connected to the generator-terminals $a\,b$ and include the primary of the step-up transformer T'. The secondary of this transformer is included in circuit with the transmission-line $l'\,l^2$ and the primary of the step-down transformer $T^2$, the secondary of which is in circuit with the mains $f\,g$. To measure the voltage $E^2$ at the center of distribution, the resistance $r$ and inductance $s$ are included between the terminals C' D of the secondary coil of the transformer $t$.

It will be unnecessary to repeat the way the potential $E^2$ is measured in the system shown in Fig. 3, as this has been fully explained in connection with the system shown in Fig. 2.

I do not wish to be limited to the direct metallic connection of the conductor, including the meter with the mains.

Having thus described my invention, I claim as new and desire to secure by Letters Patent—

1. The combination with a source of alternating current, of a resistance equal or proportional to the resistance of the transmission-line and inductance equal or proportional to the inductance of the transmission-line, a transformer having its primary supplied with current from the transmission-circuit, the secondary circuit of the transformer including the resistance and inductance, and a voltmeter included in circuit with a conductor receiving current from the main circuit, the said conductor including the meter and secondary of the said transformer in series, the said inductance and resistance being also included in series with the said conductor and meter but in a branch connected in parallel with the secondary of the transformer, substantially as described.

2. The combination with a source of alternating current, of a resistance equal or proportional to the resistance of the transmission-line and inductance equal or proportional to the inductance of the transmission-line, a transformer having its primary in series with a main conductor of the supply-circuit, the secondary circuit of the transformer including the resistance and inductance, a conductor in bridge with the mains, and a voltmeter, said conductor including the voltmeter and the secondary of the transformer in series and also including the voltmeter and the resistance and inductance in series, the resistance and inductance being included in one branch connected in parallel with the secondary coil of the transformer, substantially as described.

3. The combination with a source of alternating current, of a resistance equal or proportional to the resistance of the transmission-line and inductance equal or proportional to the inductance of the transmission-line, a transformer having its primary supplied with current from the transmission-circuit, the secondary circuit of the transformer including the resistance and inductance, and a voltmeter included in circuit with a conductor mechanically connected with the transmission-lines to form a bridge, receiving current from the main circuit, the said conductor including the meter and secondary of the said transformer in series, the said inductance and resistance being also included in series with the said conductor and meter but in a branch connected in parallel with the secondary of the transformer, substantially as described.

4. The combination with a source of alternating current, of a resistance equal or proportional to the resistance of the transmission-line and inductance equal or proportional to the inductance of the transmission-line, a transformer having its primary in series with a main conductor of the supply-circuit, the secondary circuit of the transformer including the resistance and inductance, a conductor in metallic bridge with the mains, and a voltmeter, said conductor including the voltmeter and the secondary of the transformer in series and also including the voltmeter and the resistance and inductance in series, the resistance and inductance being included in one branch connected in parallel with the secondary coil of the transformer, substantially as described.

In witness whereof I hereunto subscribe my name this 29th day of August, A. D. 1898.

ERNST GUSTAV PAUL OELSCHLÄGER.

Witnesses:
PAUL ROEDIGER,
CARL ALBRECHT.